Sept. 8, 1970          A. L. BOUGHNER          3,527,541

METHOD AND APPARATUS FOR TESTING FILM CLARITY

Filed April 23, 1968

United States Patent Office

3,527,541
Patented Sept. 8, 1970

---

3,527,541
METHOD AND APPARATUS FOR TESTING FILM CLARITY
Abraham Lewis Boughner, Aston Township, Chester, Pa., assignor to FMC Corporation, Philadelphia, Pa., a corporation of Delaware
Filed Apr. 23, 1968, Ser. No. 723,375
Int. Cl. G01n *21/20*
U.S. Cl. 356—202   6 Claims

ABSTRACT OF THE DISCLOSURE

A method and apparatus for testing the clarity of transparent film and assigning a definitive value thereto whereby the relative clarity of a film may be objectively compared with any other film or with a preselected standard. The clarity value is determined by viewing a lined background along a line of sight that passes through the film in a direction normal to the plane of the film, rotating the film about an axis parallel to the lines of the background until the film is at such an angle to the line of sight that the lines of the background are substantially invisible, measuring the angle and assigning the measurement as the film clarity value.

---

The present invention relates to a method and apparatus for definitively evaluating the clarity of a transparent film and more particularly to such a method and apparatus which may be used to quickly evaluate the optical properties of a fairly large sample of film and which does not require the use of expensive or complex equipment.

The see-through or optical properties of transparent film are affected by various factors such as haze, sheet flatness and mechanical process imperfections. These factors may be individually evaluated by known techniques involving the use of complex electronic equipment. Not only do the known techniques involve individual evaluations of the various factors but are laborious and time consuming inasmuch as each evaluation involves only a very small segment or area of film. It is often desirable to know how the over-all optical properties of a particular film compare with those of another film. Thus, a film manufacturer may want to know whether film being made at a particular time compares favorably or unfavorably in overall clarity with film he has previously made or with a similar type of film made by another manufacturer. Through use of the present invention, the various factors affecting film clarity are integrated into a single evaluation which is given a definitive value such as a number whereby any given film may be readily compared as to clarity with any other film.

It is therefore an object of the present invention to provide a method whereby the over-all clarity of a transparent film may be numerically or otherwise defined whereby the clarity of a particular film may be readily compared to any other film or to a preselected standard.

It is another object of the invention to provide an easily operated and inexpensive apparatus useful in carrying out the method.

Figure 1:
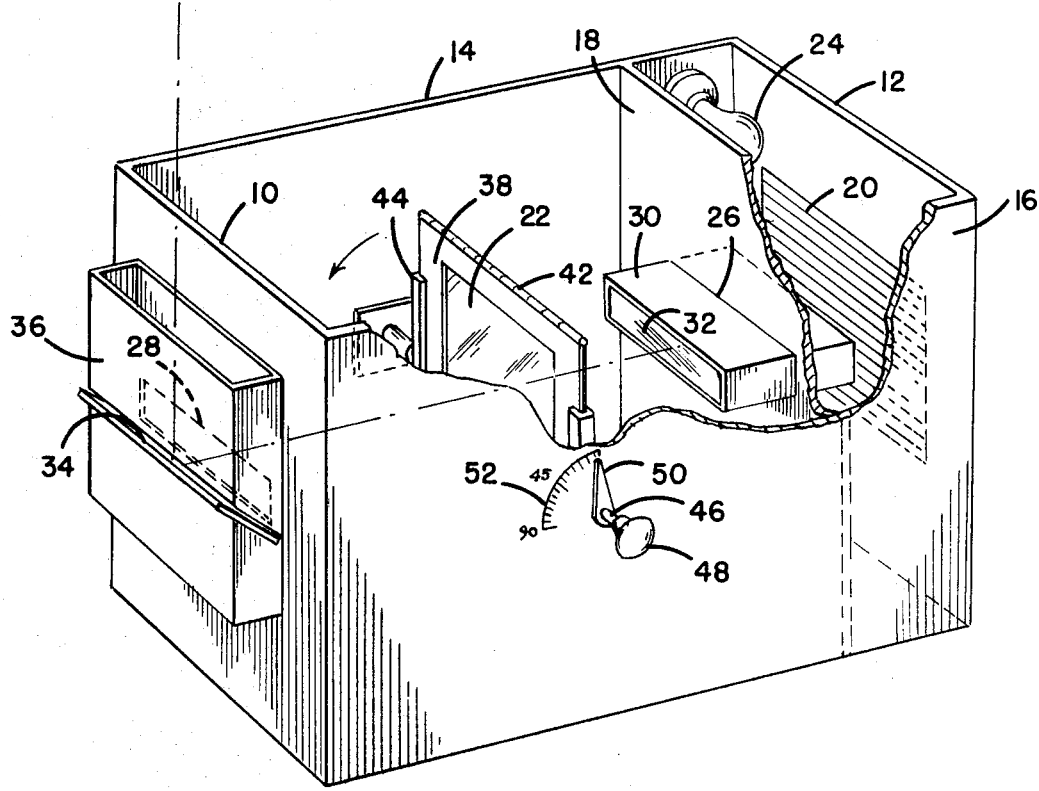
Figure 2:
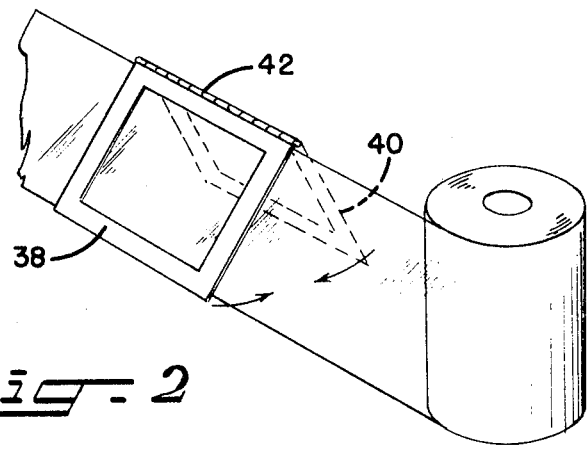

Referring now to the drawing:
FIG. 1 is an isometric view of the apparatus; and
FIG. 2 is an isometric view showing the manner of mounting a film sample evaluation.

Before describing the apparatus in detail, the method of evaluating the film will be briefly explained. It is recognized that a transparent film (the term "transparent" being used in a somewhat relative sense) is more readily seen through when the line of sight is normal or perpendicular to the plane of the film, and a rough judgment of clarity may be made by turning the film so that it lies at such an angle to the line of sight that an object viewed therethrough appears blurred or only barely apparent. However, it requires an experienced observer with a good memory to validly assess the clarity of any particular film with respect to another film which he may have examined at some remote time in the past. According to the present invention, the film being tested for clarity is held in front of a background which has a plurality of parallel lines extending thereacross and the lines of the background are observed by looking through the film along a line of sight normal to the film and unless the film clarity is extremely poor, the lines will be clearly visible. The film is then turned or rotated about an axis parallel to the lines of the background until the film is at such an angle that the background lines are no longer visible through a substantial area of the film. The angle through which the film has been turned is then measured and this measurement, either in actual degrees or some other preselected system is assigned as a value of clarity. In this manner, films may be accurately compared with one another or with a predetermined standard of quality at remote times and even by different observers.

Normal manufacturing procedures produce a film having an indefinite length or a length which is greatly in excess of its width. The length direction is known as the machine or longitudinal direction and the width direction is referred to as the transverse direction. Often, if not always, the clarity value determined by the above described procedure is different when the film is viewed through these two directions. It is therefore contemplated that the film being tested should be observed twice, once with the longitudinal direction of the film being parallel to the lines of the background and once with the transverse direction being parallel to the lines of the background. The angles through which the film is turned to obliterate the lines of the background may then be noted separately for the two directions of the film or may be integrated into a single value, as desired.

The apparatus employed for carrying out the method comprises a closed cabinet having a front wall 10, a back wall 12 and side walls 14 and 16, the latter being shown partially broken away. The cabinet also has a top which has been omitted from the drawing in order to expose the interior. A partition 18 divides the cabinet into two compartments, one of which contains a viewing screen 20 and in the other of which is mounted a film sample 22 the clarity value of which is to be established. Screen 20 is mounted on the back wall 12 and comprises a solid color background and a plurality of spaced apart horizontal lines of a color contrasting with the background. A suitable lamp 24 or the like illuminates screen 20 and aligned openings 26 and 28 in the partitions 18 and the front wall 10 respectively permit the screen to be viewed through the film sample from outside the cabinet. A tubular shield or tunnel 30 extends through the opening 26 to prevent light from lamp 24 from scattering into the chamber containing the film sample. To minimize eye strain from prolonged use of the apparatus, a filter 32 appropriate for the colors of screen 20 may be mounted in the tunnel. In order to positively confine the line of sight, the viewing is done from a point above the front of the cabinet through a mirror 34 mounted adjacent the bottom edge of opening 28 and extending at an angle of 45° to the front wall 10. A shield 36 around the mirror confines the view point to an alignment extending at 90° to a line through the two openings 26 and 28. If desired, mirror 34 and shield 36 may be omitted but in that event it will be somewhat more difficult for the observer to concentrate his attention on the exact line through openings 26 and 28.

The film to be tested is mounted in a wrinkle-free condition in a holder having a front side 38 and a back 40 secured together by a suitable hinge 42. The front and back of the holder have openings therein whereby a substantial area of film is exposed and any suitable clasp may be employed for securing the front and back together with the film sample clamped therebetween.

Swingably mounted between the side walls 14 and 16 of the cabinet is a support 44 which is grooved or otherwise adapted to receive and support the film sample holder. A shaft 46 serving as one of the pivots for support 44 extends through the side wall 16 and has secured thereto a knob or other manipulatable means 48 whereby said holder may be rotated about a central axis extending parallel to the lines of screen 20. A pointer 50 secured to shaft 46 cooperates with a scale 52 to indicate the angular position of support 44 and film sample 22. Scale 52 may be divided into degrees of angularity as indicated in the drawing or may bear any other desired indicia donating the angular position of the film with respect to the vertical.

In using the apparatus, the film holder containing the film in a wrinkle-free condition is placed in support 44 at a time when knob 48 is turned so as to position the support in a vertical position. The film holder may be introduced into the cabinet through a suitable door in the top of the cabinet. Unless the film clarity is exceptionally poor, the lines of screen 20 will be readily apparent through the film when the observer looks into mirror 34 since the line of sight to the screen extends normal or perpendicular to the film. The knob 48 is then turned slowly until the lines of the screen are no longer discernible through a substantial area of the film and the position of pointer 50 on the scale 52 is assigned as the clarity value of the film. As previously mentioned, the film is examined twice, once with the longitudinal or film direction extending vertically in the holder and once with the longitudinal direction of the film extending horizontally. The two readings of the scale 52 may be recorded separately or may be averaged, added together or otherwise integrated, as desired. Having thus subjectively placed a definitive value on the clarity of a film, such value may be objectively compared at any time with the clarity of any other film similarly evaluated.

Having thus described a preferred embodiment of the invention and a preferred method of carrying it out, what is claimed is:

1. A method of assigning a definitive value to the clarity of a transparent film comprising positioning a film sample in a plane spaced from a lined background, rotating the film about an axis parallel to the lines of the background until the film is at such an angle that the lines of the background are substantially invisible when viewed through the film in a direction normal to the original positioning of the film, measuring said angle, and using said measure as a value for film clarity.

2. The method set forth in claim 1 wherein rotation is made to occur about a central axis of the film.

3. An apparatus useful in assigning a definitive value to film clarity comprising a closed cabinet, a screen mounted in said cabinet, means in said cabinet for lighting said screen, said screen having a solid color background and a plurality of parallel lines of a color contrasting with the background, film supporting means in said cabinet for supporting a film sample in a plane spaced from said screen, an opening in said cabinet permitting said screen to be viewed through the film sample in a direction normal to the film sample, manipulatable means for rotating said film supporting means about an axis parallel to the lines on the screen whereby to position the film supporting means at such an angle that the lines on the screen are substantially invisible when viewed through said opening in a direction normal to the original position of the film sample, and means for indicating the angle through which the film supporting means is rotated.

4. The apparatus set forth in claim 3 comprising a partition in said cabinet dividing the cabinet into two compartments one of which contains said screen and the other of which contains said film supporting means, and an opening in said partition aligned with the opening in said cabinet whereby the screen may be viewed through the two openings.

5. The apparatus set forth in claim 4 wherein the means for lighting said screen is located in the compartment containing said screen, and a tubular shield extending through the opening in said partition to prevent light from scattering into the chamber containing the film supporting means.

6. The apparatus set forth in claim 3 wherein said screen is mounted vertically at one end of said cabinet with the parallel lines thereof extending horizontally, and said film supporting means comprising a substantially rectangular frame mounted in said cabinet for rotary movement about a central axis extending parallel to the lines of said screen.

References Cited
UNITED STATES PATENTS 2,198,971   4/1940   Neufeld.

RONALD L. WIBERT, Primary Examiner

T. MAJOR, Assistant Examiner

U.S. Cl. X.R.
356—239